US011327055B2

(12) United States Patent
Burnett et al.

(10) Patent No.: US 11,327,055 B2
(45) Date of Patent: May 10, 2022

(54) AUTOSAMPLER SEAL PACK FOR REDUCING A CARRYOVER PERCENTAGE

(71) Applicant: Waters Technologies Corporation, Milford, MA (US)

(72) Inventors: Joshua A. Burnett, Taunton, MA (US); Marc E. Lemelin, Douglas, MA (US); Sylvain Gilles Cormier, Mendon, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 478 days.

(21) Appl. No.: 16/368,402

(22) Filed: Mar. 28, 2019

(65) Prior Publication Data
US 2019/0302066 A1 Oct. 3, 2019

Related U.S. Application Data

(60) Provisional application No. 62/650,140, filed on Mar. 29, 2018.

(51) Int. Cl.
*G01N 30/18* (2006.01)
*B01D 15/14* (2006.01)
*G01N 30/24* (2006.01)
G01N 30/02 (2006.01)
G01N 35/10 (2006.01)

(52) U.S. Cl.
CPC ............ *G01N 30/18* (2013.01); *B01D 15/14* (2013.01); *G01N 30/24* (2013.01); *G01N 35/1004* (2013.01); *G01N 2030/027* (2013.01); *G01N 2030/185* (2013.01)

(58) Field of Classification Search
CPC .... G01N 30/18; G01N 30/24; G01N 35/1004; G01N 2030/027; G01N 2030/185; B01D 15/14
See application file for complete search history.

(56) References Cited

U.S. PATENT DOCUMENTS 4,094,196 A   6/1978  Friswell
6,494,939 B1 * 12/2002  Tipler .................... G01N 30/10
                                                        96/105
(Continued)

FOREIGN PATENT DOCUMENTS

EP     2980580 A1   2/2016

OTHER PUBLICATIONS

International Preliminary Report on Patentability in PCT/US2019/024665 dated Oct. 8, 2020.
(Continued)

*Primary Examiner* — Xin Y Zhong
(74) *Attorney, Agent, or Firm* — Schmeiser, Olsen & Watts LLP; Jason A. Murphy

(57) ABSTRACT

A seal pack of a sample manager of a liquid chromatography system having a plurality of wash flow pathways fluidically connected to a central pathway that accommodates a sample needle, wherein a first wash flow pathway is vertically offset from a second wash flow pathway, such that a wash solution flows axially along an exterior surface of the sample needle in a vertical direction to wash the sample needle when flowing from the first wash flow pathway to the vertically offset second wash flow pathway, is provided. Furthermore, an autosampler and associated methods are also provided.

8 Claims, 9 Drawing Sheets

(56) References Cited

U.S. PATENT DOCUMENTS

| | | | | |
|---|---|---|---|---|
| 7,337,653 B2* | 3/2008 | Togashi | ............ | G01N 35/1004 |
| | | | | 73/61.56 |
| 2011/0189713 A1* | 8/2011 | Le Comte | ................ | G01N 1/38 |
| | | | | 435/29 |
| 2013/0306117 A1* | 11/2013 | Yamazaki | .......... | G01N 35/1004 |
| | | | | 134/171 |

OTHER PUBLICATIONS

International Search Report for application No. PCT/US2019/024665 dated Jul. 24, 2019.

\* cited by examiner

AUTOSAMPLER SEAL PACK FOR REDUCING A CARRYOVER PERCENTAGE

RELATED APPLICATIONS

This application is a non-provisional patent application claiming priority to U.S. Provisional Patent Application No. 62/650,140, filed Mar. 29, 2018, entitled "Autosampler Seal Pack For Reducing A Carryover Percentage," which is incorporated herein by reference.

FIELD OF TECHNOLOGY

The following relates to embodiments of a seal pack, and more specifically to embodiments of a seal pack of an autosampler for liquid chromatography systems having an improved carryover percentage.

BACKGROUND

Liquid chromatography is a technique in analytic chemistry where distinct components of a mixture are identified by separating the individual components by passing the mixture through an adsorbent medium using fluid flow so that the components elute at different rates. Liquid chromatography systems are typically comprised of a solvent delivery pump, an autosampler, a column, and a detector. The solvent delivery pump pumps mobile phase fluid through the system, the autosampler introduces the sample to be analyzed to the analytic flow path, the column contains the adsorbent packing material used to effect separation, and the detector detects the separated components as they elute out of the column.

In certain liquid chromatography systems, seal packs are a part of the autosampler that is responsible for making a high-pressure seal with the outer diameter of the sample needle to allow for injection of a sample into an analytic flow stream. Further, the seal pack is responsible for washing the sample needle with a solvent from a wash reservoir. The sample needle is washed to remove/clean remaining sample from a previous run. Sample leftover on the sample needle may increase a carryover percentage, which is the presence of an analyte after a blank having no sample is injected into the analytic flow path. A carryover percentage above certain limits can adversely affect the analytical data obtained from the liquid chromatography run.

Thus, a need exists for improving a washing of the sample needle to reduce a carryover percentage.

SUMMARY

A first aspect relates generally to a seal pack of a sample manager of a liquid chromatography system, the seal pack comprising: a plurality of wash flow pathways fluidically connected to a central pathway that accommodates a sample needle, wherein a first wash flow pathway is vertically offset from a second wash flow pathway, such that a wash solution flows axially along an exterior surface of the sample needle in a vertical direction to wash the sample needle when flowing from the first wash flow pathway to the vertically offset second wash flow pathway.

In addition or alternatively, the wash solution flows within the central pathway between the first wash flow pathway and the second wash flow pathway.

In addition or alternatively, the wash solution washes the sample needle as the sample needle moves vertically within the seal pack.

In addition or alternatively, the seal pack includes an upper body portion, a middle portion, and a lower body portion, which form a general body structure of the seal pack.

In addition or alternatively, the first wash flow pathway and the second wash flow pathway are both disposed within the upper body portion.

In addition or alternatively, the first wash flow pathway includes a wash inlet fluidically connected to an external wash reservoir of the liquid chromatography system.

In addition or alternatively, the exterior surface of the sample needle is simultaneously cleaned by the wash solution at two different subsections of the exterior surface of the surface needle.

In addition or alternatively, the two different subsections of the exterior surface of the sample needle being simultaneously cleaned are located above and below a high-pressure seal arrangement within the seal pack, respectively.

In addition or alternatively, a carryover percentage is equal to or less than 0.0025%.

A second aspect relates generally to a seal pack of a sample manager of a liquid chromatography system, the seal pack having an upper body portion, a middle body portion, and a lower body portion, which forms a general body structure of the seal pack, the seal pack comprising: a central flow path extending vertically through the seal pack, the central flow path accommodating a sample needle, a wash inlet disposed in the upper body portion, configured to receive a wash solution, the wash inlet connecting to the central flow path, a first wash path disposed in the upper body portion and connected to the central flow path, the first wash path being vertically offset from the wash inlet, a connecting wash path extending through the upper body portion, the middle body portion, and the lower body portion, the connecting wash path connecting the first wash path to a second wash path disposed in the lower body portion, wherein the second wash path is connected to the central flow path, a third wash path disposed in the lower body portion, the third wash path being vertically offset from the second wash path, and a wash outlet disposed in the middle body portion, the wash outlet being fluidically connected to a suction pump for drawing the wash solution through the seal pack.

In addition or alternatively, when the wash solution flows from the wash inlet to the first wash path, the wash solution flows axially along the sample needle in a vertical direction to directly wash the sample needle.

In addition or alternatively, when the wash solution flows from the second wash path to the third wash path, the wash solution flows axially along the sample needle in a vertical direction to directly wash the sample needle.

In addition or alternatively, the seal pack does not include a lower wash frit.

In addition or alternatively, the seal pack includes an upper wash frit retainer and an upper wash frit, wherein the sample needle passes through the upper wash frit.

In addition or alternatively, the seal pack includes a bushing disposed within the lower body portion, the bushing having a central bore for receiving the sample needle as the sample needle moves toward a sample source.

In addition or alternatively, the bushing is comprised of a non-metal material and prevents damage to the sample needle from contacting a metal surface of the seal pack as the sample needle moves towards and away from the sample source.

In addition or alternatively, the wash solution is flowing through the seal pack as the sample needle is moving within the seal pack.

In addition or alternatively, the seal pack includes a first high-pressure seal and a second high-pressure seal, the first high-pressure seal and the second high-pressure seal are disposed within the middle body portion, and form a seal around the sample needle at a point where a sample is injected into an analytic flow path.

In addition or alternatively, a carryover percentage is equal to or less than 0.0025%.

A third aspect relates generally to an autosampler of a liquid chromatography system, comprising: a sample needle, the sample needle configured to aspirate a sample from at least one sample source and inject the sample into an analytic flow path of the liquid chromatography system, a seal pack, the seal pack comprising a plurality of wash flow pathways fluidically connected to a central pathway that accommodates the sample needle, wherein a first wash flow pathway is vertically offset from a second wash flow pathway, a pump delivering a mobile phase to the seal pack, and a needle wash pump fluidically connected to the seal pack to draw a wash solution through the plurality of wash flow pathways of the seal pack and into a waste reservoir, wherein, when the needle wash pump draws the wash solution through the plurality of wash flow pathways, a wash solution flows axially along an exterior surface of the sample needle in a vertical direction to wash the sample needle when flowing from the first wash flow pathway to the vertically offset second wash flow pathway.

In addition or alternatively, the wash solution flows within the central pathway between the first wash flow pathway and the second wash flow pathway.

In addition or alternatively, the first wash flow pathway and the second wash flow pathway are both disposed within an upper body portion of the seal pack.

In addition or alternatively, the first wash flow pathway includes a wash inlet fluidically connected to the wash reservoir.

In addition or alternatively, the exterior surface of the sample needle is simultaneously cleaned by the wash solution at two different subsections of the exterior surface of the surface needle.

In addition or alternatively, the two different subsections of the exterior surface of the sample needle being simultaneously cleaned are located above and below a high-seal arrangement within the seal pack, respectively.

A fourth aspect relates generally to a method of washing a sample needle of a liquid chromatography system, the method comprising: directing a wash fluid axially along an exterior surface of a sample needle contained within a central pathway of a seal pack, the central pathway guiding the sample needle in a vertical only direction, wherein the directing the wash solution axially along the exterior surface of the needle includes: connecting a wash fluid inlet flow path located in an upper body portion of the seal back to the central pathway, and vertically offsetting a wash flow path located within the upper body portion from the wash fluid inlet flow path along the central pathway, wherein a needle wash pump fluidically connected to a wash flow outlet disposed within the seal pack is configured to draw the wash solution from the wash fluid inlet flow path through the central pathway against the exterior surface of the sample needle to the wash flow path.

In addition or alternatively, the directing the wash solution axially along the exterior surface of the needle further includes: interconnecting the wash flow path located in the upper body portion of the seal pack with a first wash flow path located in a lower body portion of the seal pack; connecting the first wash flow path to the central pathway; and vertically offsetting a second wash flow path located in the lower body portion of the seal pack from the first wash flow path along the central pathway.

In addition or alternatively, the wash fluid washes the sample needle as the sample needle moves vertically within the central pathway.

In addition or alternatively, the wash fluid outlet is located in a middle portion of the seal pack.

In addition or alternatively, the method further includes drawing air through a bushing disposed in the lower body portion of the seal pack as the wash fluid is drawn through the seal pack to reduce an overall solvent consumption rate as a needle wash pump is turned on.

In addition or alternatively, the method further includes disposing a bushing having a bore for receiving the sample needle in the lower body portion of the seal pack, the bushing preventing the sample needle from contacting a surface of the lower body portion of the seal pack as the sample needle moves vertically in and out of the seal pack to aspirate a sample.

In addition or alternatively, a carryover percentage is equal to or less than 0.0025%.

A fifth aspect relates to a wash sequence for washing a sample needle of an autosampler of a liquid chromatography system, the wash sequence comprising: continuously washing an exterior surface of the sample needle contained within a seal pack of the autosampler as the sample needle moves toward a sample source located proximate the seal pack, for a predetermined amount of time.

In addition or alternatively, the exterior surface of the sample needle is washed as the sample needle moves up and away from the sample source.

In addition or alternatively, in a first sequence, the predetermined amount of time is between 3-4 seconds, as the sample needle moves from inside the seal pack to the sample source.

In addition or alternatively, in a second sequence, the predetermined amount of time is between 14-16 seconds, as the sample needle moves towards the sample source.

In addition or alternatively, in the second sequence, a movement speed of the sample needle from inside the seal pack to the sample source is reduced to extend the predetermined amount of time, as compared to a movement speed of the sample needle in the first sequence.

In addition or alternatively, in a third sequence, the predetermined amount of time is equivalent to the second sequence, and also includes an additional washing step for a predetermined amount of time as the sample needle moves away from the sample source.

In addition or alternatively, the predetermined amount of time of the additional washing step is equivalent to the predetermined amount of time for the second sequence.

In addition or alternatively, the continuous washing of the exterior surface of the sample needle occurs axially along the sample needle in a vertical direction, within a central pathway of the seal pack.

In addition or alternatively, a wash fluid directly contacts the exterior surface of the sample needle during the continuous washing.

In addition or alternatively, the sample needle only moves up and down within the seal pack during the continuous washing.

In addition or alternatively, the sample needle is not relocated to a separate component for washing, and remains within a central pathway of the seal pack.

In addition or alternatively, a carryover percentage is equal to or less than 0.0025%.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

The cross-sectional views are composite images, as internal features may be in three different sectional planes.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
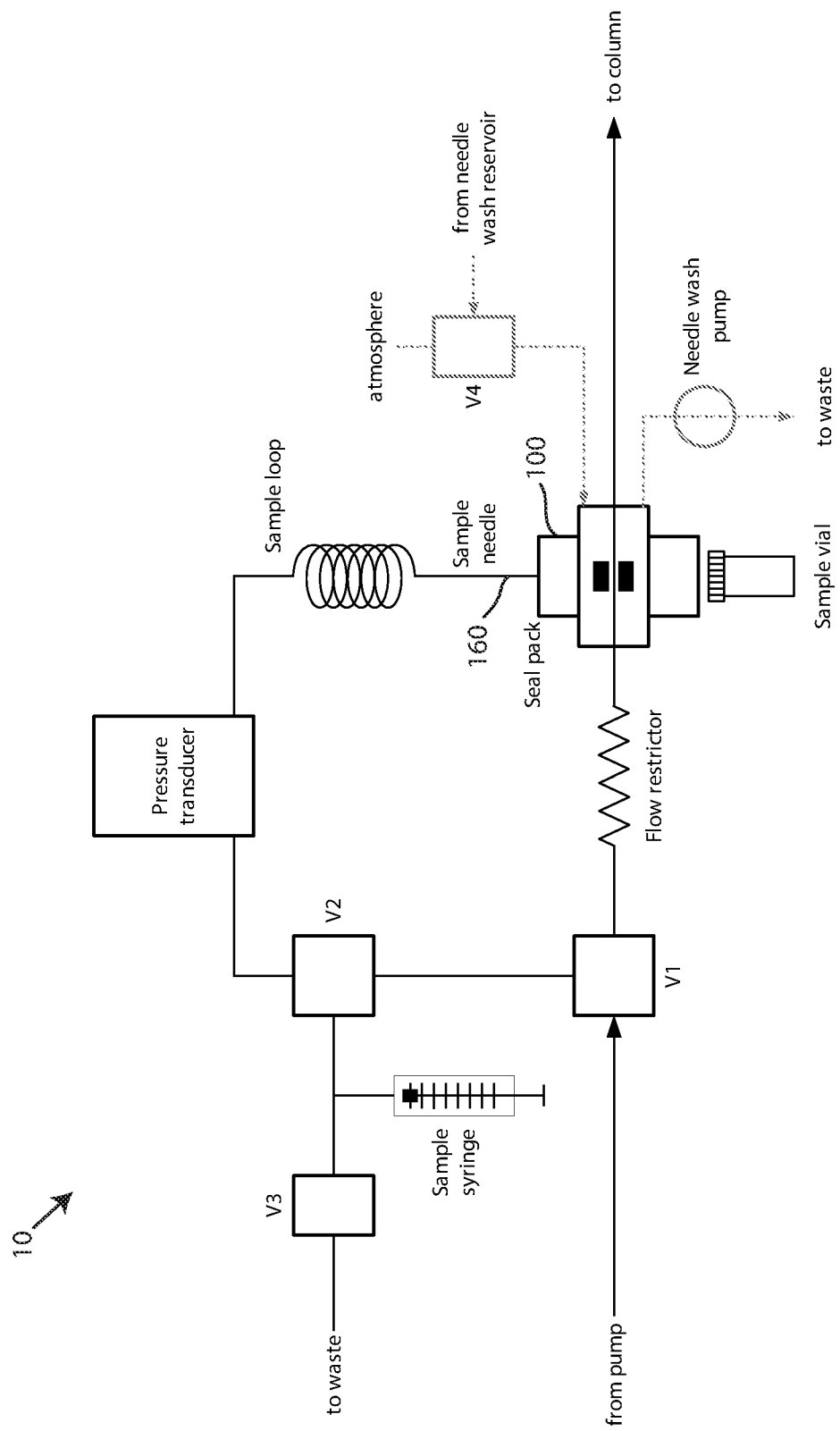
FIG. 1 depicts a fluidics diagram of an autosampler of a liquid chromatography system having a seal pack, in accordance with embodiments of the present invention.

Referring to the drawings, FIG. 1 depicts a fluidics diagram of an autosampler of a liquid chromatography system 10 having a seal pack 100, in accordance with embodiments of the present invention. An entire liquid chromatography system may not be shown in FIG. 1, but system 10 may also include conventional components of a liquid chromatography system not shown, such as a column, detector, solvent reservoir, etc. Embodiments of the liquid chromatography system 10 may include a valve V1 (e.g. high-pressure needle valve) fluidically connected to a pump, such as a solvent delivery pump, a valve V2 (high-pressure needle valve), a valve V3 (e.g. two-way solenoid valve) fluidically connected to the valve V2, a valve V4 (e.g. three-way solenoid valve), a pressure transducer, a sample loop, a flow restrictor, a seal pack 100, a sample needle 160, a sample source (e.g. sample vial), a wash reservoir, a needle wash pump, one or more waste reservoirs, and a sample syringe In the system 10, a movement of the sample needle 160 may be limited to vertical movement. For example, the sample needle 160 may not move in any other direction but up and down, to aspirate a sample from a sample source and inject the sample into an analytic flow path, within the seal pack 100. Embodiments of system 10 may further include a carousel of sample vials that may rotate underneath the seal pack 100 to bring the proper sample source (e.g. sample vial) into alignment with the sample needle 160 of the seal pack 100. Once aligned, the sample needle 160 may be dropped down through the seal pack 100 into the sample source to aspirate the sample into the sample needle 100 and into the sample loop. The sample is aspirated through a side port opening disposed a distance from the tip of the sample needle 160, and when the sample needle 160 enters the sample source, some sample contacts and may remain on the exterior surface of the sample needle 160, which may contaminate results or otherwise adversely affect a carryover percentage. After aspirating the sample, the sample needle 160 may then be pulled back up further into the seal pack 100 to inject the sample into a high-pressure analytic flow path.

The seal pack 100 shown in FIG. 1 may include high-pressure seals (shown schematically as two rectangles in the seal pack). The high-pressure seals are arranged against an outer diameter of the sample needle 160 to allow the sample to be injected through a side port of the sample needle 160 into the high-pressure flow path. The high-pressure flow path comes into the seal pack 100 on side/point of the seal pack 100 (e.g. from pump and through flow restrictor) and exits another side/point of seal pack 100 to the column. The high-pressure flow path is fluidically connected to the seal pack 100 through a small chamber surrounded by the two high-pressure seals. After aspirating the sample from the sample source, the sample needle 160 may be brought back up so that the side port is positioned within the chamber surrounded by the high-pressure seals to inject the sample into the high-pressure analytic flow path.

Furthermore, when valve V1 is closed, the high-pressure flow may be allowed to flow from the pump to the flow restrictor and into the seal pack 100. When valve V1 is open, the flow of the solvent/mobile phase may split such that a portion of the mobile phase is passing through to the flow restrictor and a portion is flowing towards valve V2. When valve V2 is open, flow may continue towards the pressure transducer and to the sample loop, and may connect the sample syringe. To start the injection, the sample needle 160 is in the seal pack, V2 is closed, and V1 is opened. The flow coming from the pump now splits as valve V1 is open, and small percentage of the flow will go through the flow restrictor and the rest of the flow will flow through valve V2 and to the pressure transducer and to the sample loop and into the needle 160, and leave the sample needle 160 through the side port of the sample needle 160 positioned between the two high-pressure seals, and then into the column. The flow of the mobile phase through the sample loop may push the sample in the sample loop and the sample needle out through the side port opening of the sample needle 160 and into the analytic flow path.

The seal pack 100 depicted schematically in FIG. 1 may house, contain, or otherwise accommodate the sample needle 160 during the injection process. Embodiments of the seal pack 100 may also have a wash fluid pathway configuration that improves upon current sample needle washing to reduce a carryover percentage of the system 10. Current sample needle washing fails to directly wash an exterior surface of the sample needle, among other things.

Figure 2:
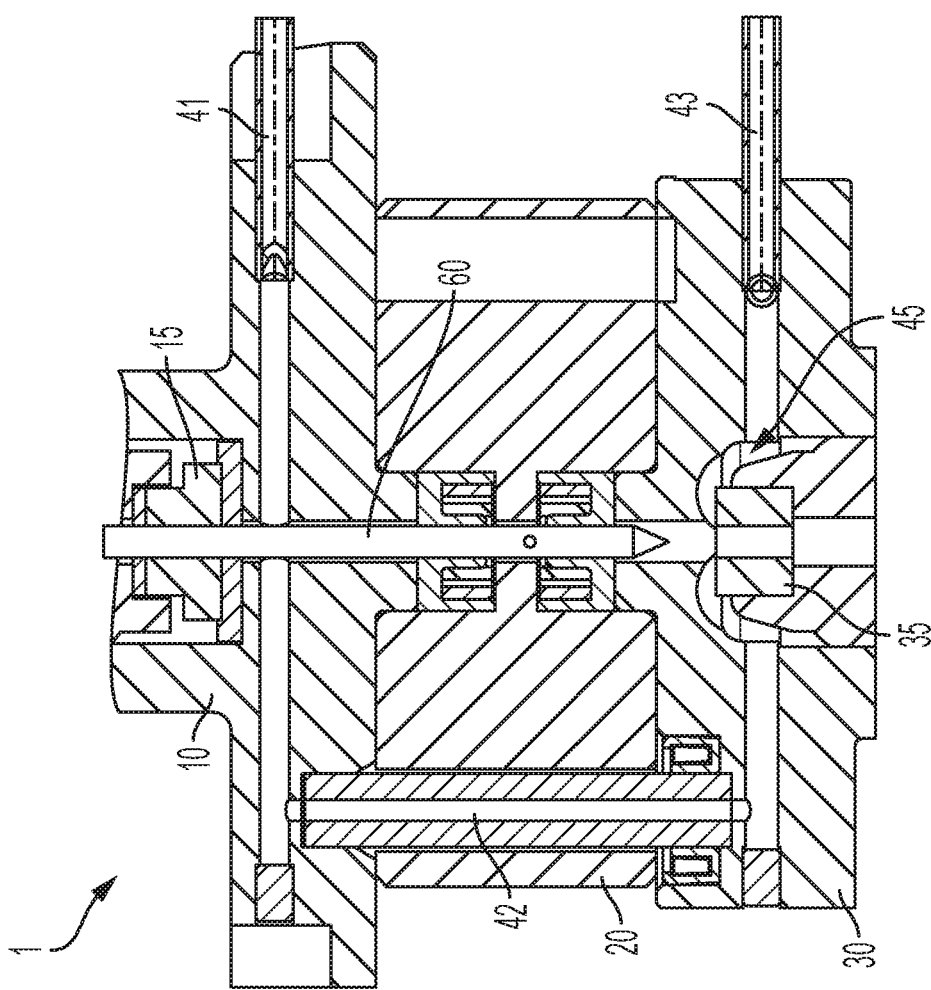
FIG. 2 depicts a cross-section view of a conventional seal pack.
Figure 3:
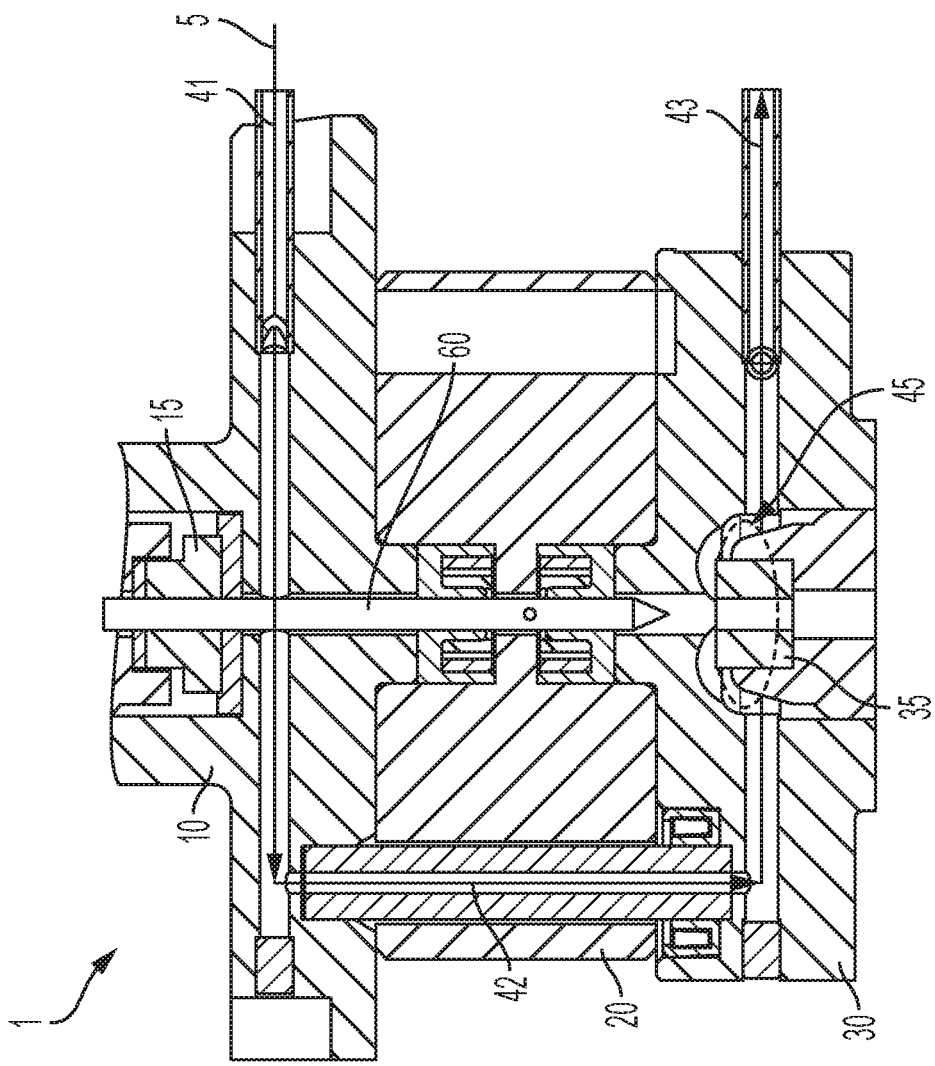
FIG. 3 depicts a wash cycle for the current seal pack of FIG. 2, when a sample needle is in a first position.
Figure 4:
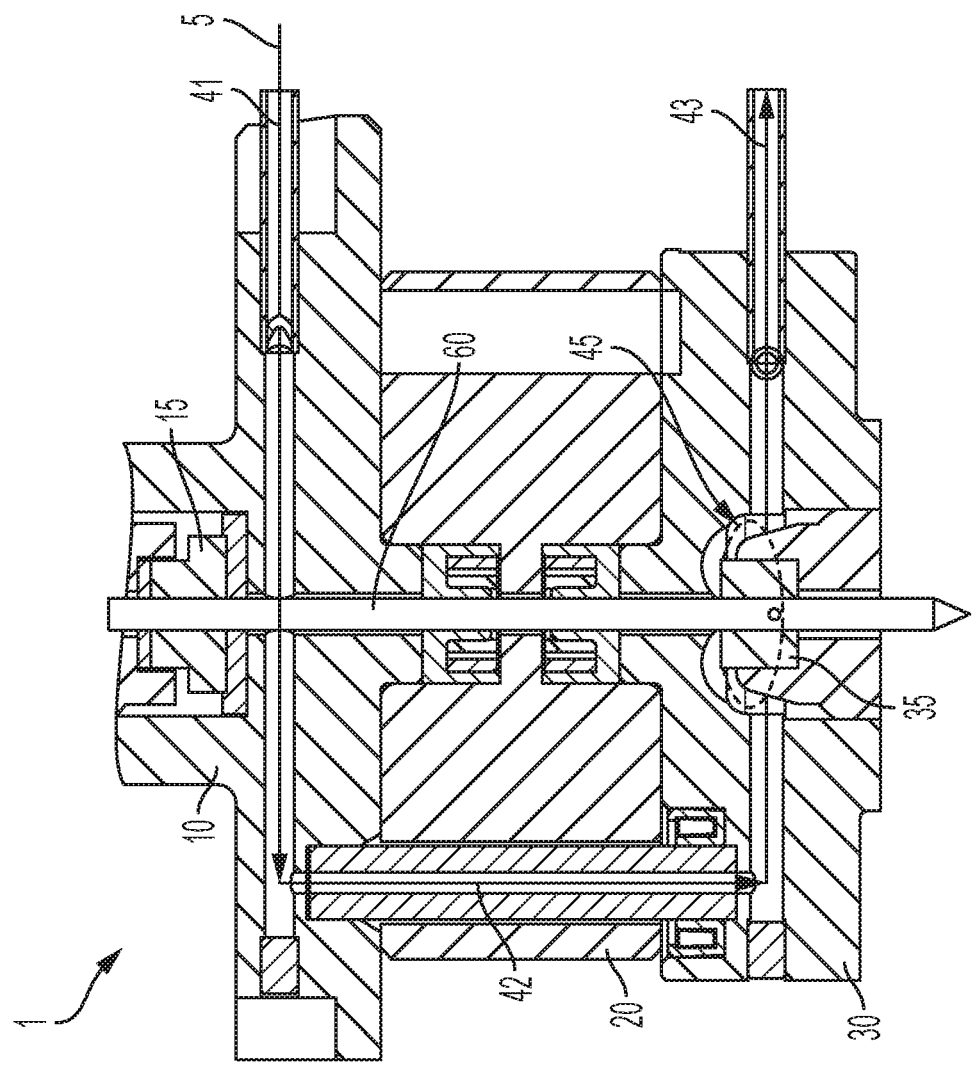
FIG. 4 depicts a wash cycle for the current seal pack of FIG. 2, when the sample needle is in a second position.

FIG. 2 depicts a cross-section view of current seal pack 1. Seal pack 1 includes an upper body portion 10, a middle body portion 20, and a lower body portion 30. The seal pack 1 may house, seal, accommodate, receive, etc. a sample needle 60. The seal pack 1 may also include an upper frit 15 and a lower frit 35. FIG. 3 depicts a wash cycle for the current seal pack 1 of FIG. 2, when the sample needle 60 is in a first position. During a wash cycle, a wash fluid 5 enters the seal pack 1 via wash inlet 41 and flow through the wash inlet pathway and then through a connection pathway 42 to a wash outlet pathway and exits the seal pack 1 via wash outlet 43. As the wash fluid 5 flows through the wash outlet pathway, the wash fluid 5 only cleans the lower frit 35, and does not directly clean an exterior surface of the sample needle 60 as the sample needle 60 is held in the first position above the lower frit 35 for a predetermined amount of time. Thus, for a predetermined amount of time that the wash fluid 5 is flowing through the seal pack 1, only the lower wash frit 35 is being contacted with wash fluid 5. However, even when the sample needle 60 is lowered to a second position passing through the lower frit 35 to aspirate a sample, the sample needle 60 is not directly contacted with the wash fluid 5. FIG. 4 depicts a wash cycle for the current seal pack 1 of FIG. 2, when the sample needle 60 is in a second position. As shown in FIG. 4, with the current design of seal pack 1, the wash fluid 5 flows around the lower frit 35 and into cavity 45 to exit the seal pack 1 via the wash outlet 43, avoiding direct contact with a surface of the sample needle 60. For instance, nothing is forcing the wash fluid 5 to flow through the lower wash frit 35, but rather the wash fluid 5 flows around the circular lower wash frit 35 through the annular cavity or gap 45 formed between the lower wash frit 35 and/or a lower wash frit retainer surrounding or partially surrounding the lower wash frit 35 and the lower body portion 20. As a result, the sample needle 60 may not be washed/cleaned well enough to remove sample residue left over from sample aspiration, thereby increasing a probability of carryover.

Figure 5:
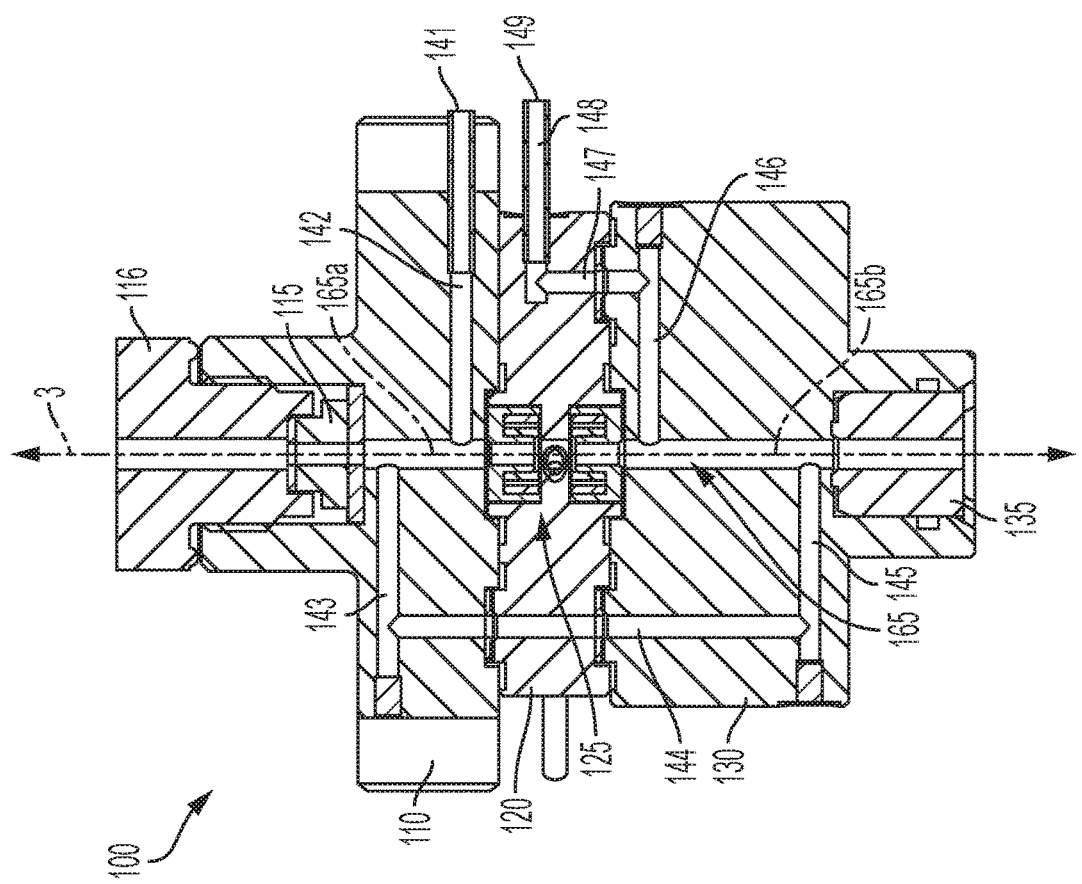
FIG. 5 depicts a cross-sectional-view of a seal pack 100, in accordance with embodiments of the present invention.

Referring still to the drawings, FIG. 5 depicts a cross-sectional-view of a seal pack 100, in accordance with embodiments of the present invention. Embodiments of the seal pack 100 may be a component in the liquid chromatography system depicted in FIG. 1. Embodiments of the seal pack 100 may include an upper frit retainer 116, an upper frit 115, an upper body portion 110, a middle body portion 120, a high-pressure seal arrangement 125 (e.g. an upper high-pressure seal and a lower high-pressure seal), a lower body portion 130, and a bushing 135 disposed within the lower body portion 130. Embodiments of the upper body portion 110, the middle body portion 120, and the lower body portion 130 may be operably coupled to each other to form a general body structure of the seal pack 100. For example, the upper body portion 110, the middle body portion 120, and the lower body portion 130 may be fastened together, coupled together, attached together, adhered together, or in some embodiments, may be structurally integral. Embodiments of the upper body portion 110, the middle body portion 120, and the lower body portion 130 may be comprised of a metal, such as stainless steel.

Embodiments of the seal pack 100 may not include a lower wash frit, such as lower wash frit 35 of seal pack 1 shown in FIGS. 2-4. Embodiments of the seal pack 100 may include a bushing 135 pressed-in to a cavity of the lower body portion 130. The bushing 135 may be a generally annular component made on a non-metal material, such as Teflon®. The bushing 135 may be disposed within the lower body portion, and have a central bore for receiving the sample needle 160 as the sample needle 160 moves toward a sample source. Because the bushing 135 may be comprised of a non-metal material, the bushing 145 may prevent damage to the sample needle 160 from contacting a metal surface of the seal pack 100 (i.e. lower body portion 130) as the sample needle 160 moves towards and away from the sample source. Additionally, air may be drawn through the bushing 135 disposed in the lower body portion 130 of the seal pack 100 as wash fluid 5 is drawn through the seal pack 100 to reduce an overall solvent consumption rate as a needle wash pump is turned on. Further, the seal arrangement 135 of the seal pack 100 may include a first high-pressure seal and a second high-pressure seal disposed within or proximate the middle body portion 120, forming a seal around the sample needle 160 at a point where a sample is injected into an analytic flow path, as described above with respect to FIG. 1.

Moreover, embodiments of the seal pack 100 may include a plurality of wash flow pathways fluidically connected to a central pathway 165 that accommodates a sample needle 160, wherein a first wash flow pathway is vertically offset from a second wash flow pathway, such that a wash solution flows axially along an exterior surface of the sample needle 160 in a vertical direction to wash the sample needle 160 when flowing from the first wash flow pathway to the vertically offset second wash flow pathway. In an exemplary embodiment, the seal pack 100 may have an upper body portion 110, a middle body portion 120, and a lower body portion 130, which forms a general body structure of the seal pack 100, the seal pack 100 including a central flow path 165 extending vertically through the seal pack 100, the central flow path 165 accommodating the sample needle 160, a wash inlet 141 disposed in the upper body portion 110, configured to receive a wash solution 5, the wash inlet 141 connecting to the central flow path 165 via flow path 142, a first wash path 143 disposed in the upper body portion 120 and connected to the central flow path 165, the first wash path 143 being vertically offset from the wash inlet 141, a connecting wash path 144 extending through the upper body portion 110, the middle body portion 120, and the lower body portion 130, the connecting wash path 144 connecting the first wash path 143 to a second wash path 145 disposed in the lower body portion 130, wherein the second wash path 145 is connected to the central flow path 165, a third wash path 146 disposed in the lower body portion 130, the third wash path 146 being vertically offset from the second wash path 145, and a wash outlet 149 disposed in the middle body portion 120, the wash outlet 149 being fluidically connected to a suction pump for drawing the wash solution 5 through the seal pack 100. Embodiments of the flow paths 141, 142, 143, 144, 145, 146, 147, 148, 149 may be paths, fluid pathways, pathways, bores, channels, tubes, connection lines, tunnels, and the like.

Figure 6:
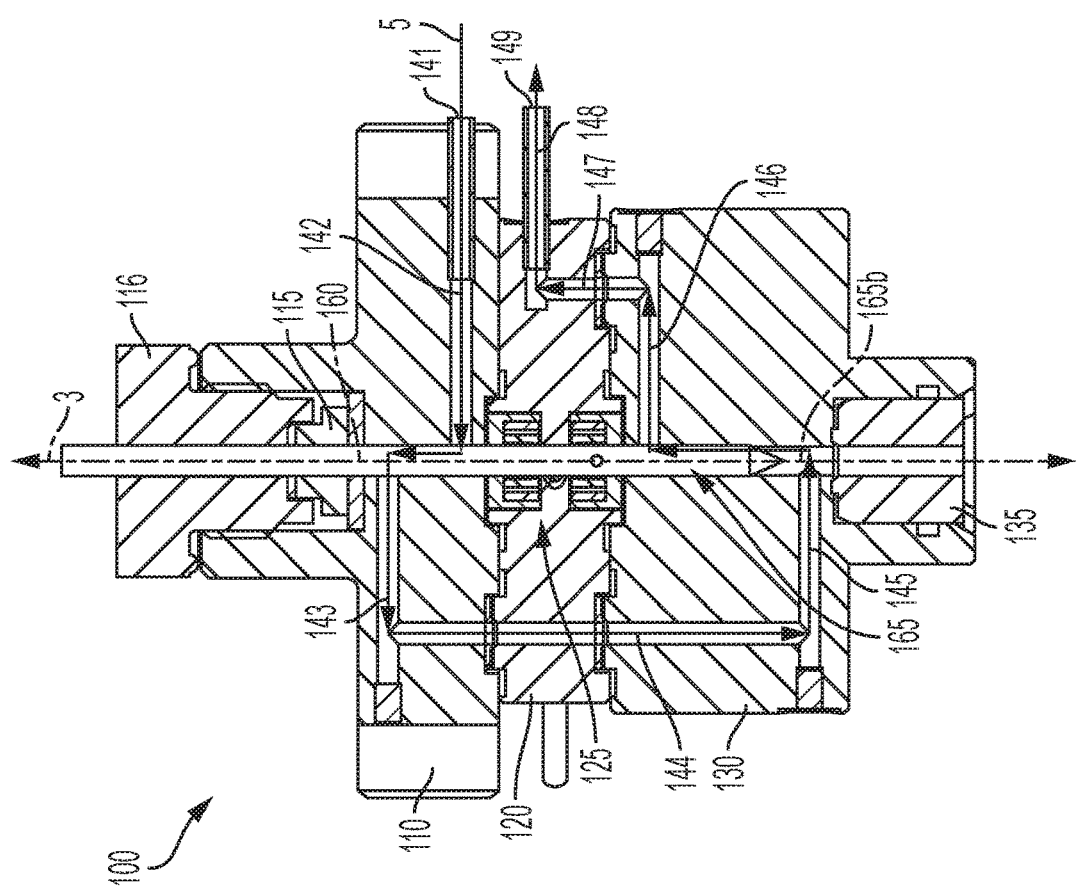
FIG. 6 depicts a wash cycle through the seal pack of FIG. 5, when the sample needle is in a first position, in accordance with embodiments of the present invention.
Figure 7:
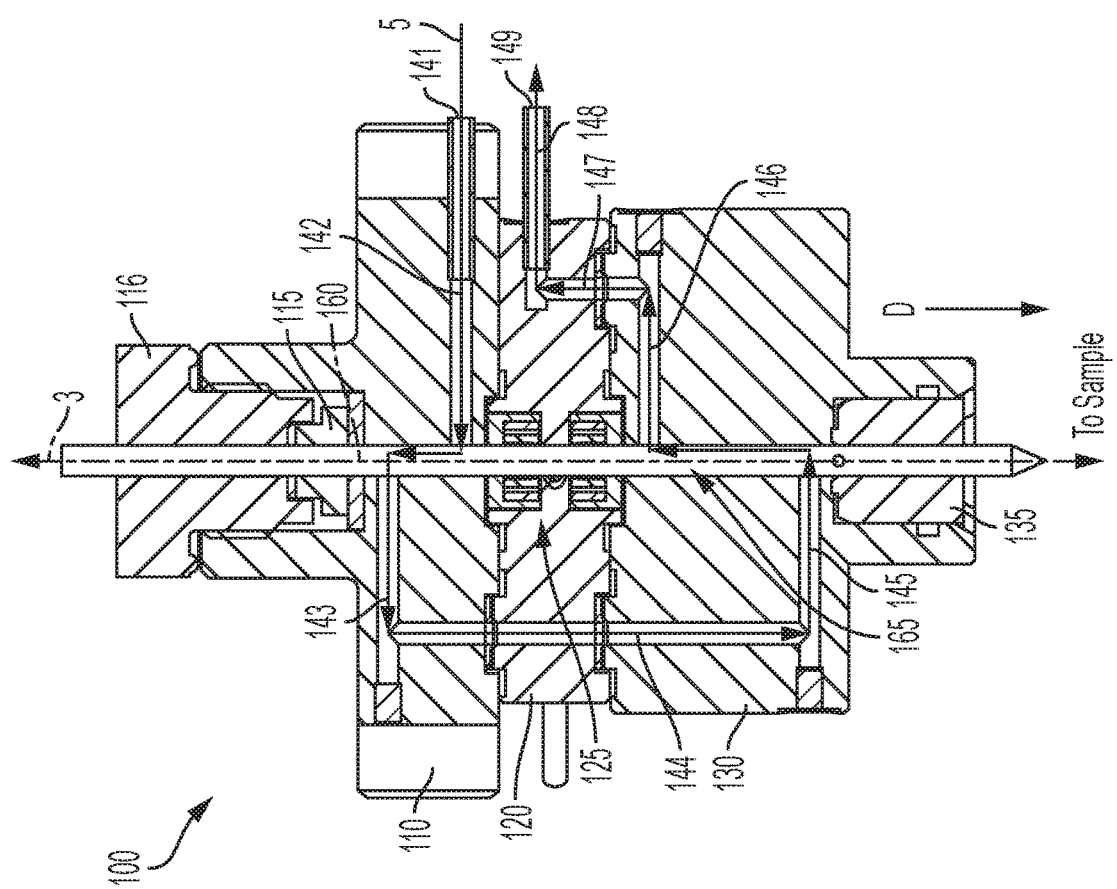
FIG. 7 depicts a wash cycle through the seal pack of FIG. 5, when the sample needle is in a second position, in accordance with embodiments of the present invention.

Embodiments of the seal pack 100 may include a central pathway 165. Embodiments of the central pathway 165 may be a channel, a tube, a path, a pathway, a fluid path, a fluid pathway, bore, tunnel, and the like, which may extend vertically along vertical axis 3. The central pathway 165 may be positioned at a center location of the seal pack 100. Further, embodiments of the central pathway 165 may receive, accommodate, contain, guide, hold, etc. the sample needle 160, as shown in FIGS. 6-7. For instance, the sample needle 160 may move up and down within the central pathway 165 along the vertical axis 3. In an exemplary embodiment, the sample needle 160 may only move vertically along vertical axis 3 to aspirate and inject the sample, and during wash cycles. The sample needle 160 may be washed without having to move the sample needle 160 to another physical location outside of the seal pack 100. Embodiments of the seal pack 100 may include a wash inlet 141. Additionally, the central pathway 165 may extend through the upper body portion 110, the middle body portion 120, the lower body portion 130, and the bushing 135. An end of the central pathway 165 proximate or otherwise near an end face of the busing 135 may include an opening that allows the sample needle 160 to exit the seal pack 100 for sample aspiration.

Embodiments of the seal pack 100 may include a wash inlet 141. Embodiments of the wash inlet 141 may be an inlet or opening proximate or at an external surface of the seal pack 100, which may be in fluid communication with a wash fluid or wash reservoir or wash source. The wash inlet 141 may be disposed within the upper body portion 110, configured to allow a wash solution or wash fluid to enter the interior of the seal pack 100. In alternative embodiments, the wash inlet 141 may be disposed in the lower body portion 130 or the middle body portion 120. The wash inlet 141 may also include a wash inlet flow path 142 that may extend within the seal pack 100 to fluidically and physically connect the wash inlet 141 to the central pathway 165. Furthermore, embodiments of the seal pack 100 may include a wash flow path 143 (e.g. a first wash flow path). Embodiments of the wash flow path 143 may be disposed within the same body portion of the seal pack 100 (e.g. upper body portion 110) as the wash inlet 141 and wash inlet flow path 142. The wash flow path 143 may be fluidically and physically connected to the central pathway 165, extending from the central pathway 165. For instance, the wash flow path 143 may extend horizontally from the central pathway 165. The wash flow path 143 may be in fluid communication or fluidically connected to the wash inlet flow path 142, via the central pathway 165. In an exemplary embodiment, the wash flow path 143 may be vertically offset from the wash inlet flow path 142 and/or wash inlet 141. For example, the flow path 143 may be interconnected with the central pathway 165 at a different point along the central pathway 165 than the wash inlet flow path 142 and/or wash inlet 141, such that a vertical distance of the central pathway 165 separates the flow path 143 and the wash inlet flow path 142/wash inlet 141. The offsetting of the flow paths creates a section of the central pathway 165 that wash fluid may travel through to get from the wash inlet flow path 142 to the wash flow path 143. As the wash fluid travels through the central pathway 165 between the flow paths 143, 142, the wash fluid washes the sample needle axially across the exterior surface of the sample needle 160, above the high-pressure seal arrangement 125.

Referring still to FIG. 1, embodiments of the seal pack 100 may include a connecting wash path 144. Embodiments of the connecting wash path 144 may interconnect physically and fluidically the wash flow path 143 and the wash flow path 145 (e.g. a second wash flow path). Embodiments of the connecting wash path 144 may be a connection path, a connector, a wash tube, a connection tube, an interconnection, and the like, configured to provide a fluid flow path between the wash flow path 143 and wash flow path 145. The connecting wash path 144 may extend in a vertical direction, parallel to vertical axis 3 through the upper body portion 110, the middle body portion 120, and the lower body portion 130. In an exemplary embodiment, the connecting wash path 144 may be a straight pathway extending parallel to the vertical axis 3. In other embodiments, the connecting path 144 may be curved or otherwise include a stepped configuration between the wash flow path 143 and the wash flow path 145. Further, a seal or washer may be disposed between the upper body portion 110 and the middle body portion 120 at a point where the connecting wash path 144 extends therethrough, and likewise between the middle body portion 120 and the lower body portion 130 where the connecting wash path 144 extends therethrough. Moreover, the wash flow path 145 may be fluidically and physically connected to the central pathway 165. The wash flow path 145 may be disposed in the lower body portion 130 of the seal pack 100.

Embodiments of the seal pack 100 may further include a wash flow path 146 (e.g. a third wash flow path). Embodiments of the wash flow path 146 may be disposed within the same body portion of the seal pack 100 (e.g. lower body portion 130) as the wash flow path 145. The wash flow path 146 may be fluidically and physically connected to the central pathway 165, extending from the central pathway 165. For instance, the wash flow path 146 may extend horizontally from the central pathway 165. The wash flow path 146 may be in fluid communication or fluidically connected to the wash flow path 145, via the central pathway 165. In an exemplary embodiment, the wash flow path 146 may be vertically offset from the wash inlet path 145. For example, the flow path 146 may be interconnected with the central pathway 165 at a different point along the central pathway 165 than the wash flow path 145, such that a vertical distance of the central pathway 165 separates the flow path 146 and the wash flow path 145. The offsetting of the flow paths creates a section of the central pathway 165, which may be discrete and distinct from the section of the central pathway 165 between path 142 and 143, that wash fluid may travel through to get from the wash flow path 145 to the wash flow path 146. As the wash fluid travels through the central pathway 165 between the flow paths 145, 146, the wash fluid washes the sample needle axially across the exterior surface of the sample needle 160, below the high-pressure seal arrangement 125.

Additionally, embodiments of the seal pack 100 may include wash outlet 149. Embodiments of the wash outlet 149 may be an outlet or opening proximate or at an external surface of the seal pack 100, which may be in fluid communication with a needle wash pump and a waste wash reservoir. For instance, a needle wash pump, which may be one or more pumps, may be connected to the wash outlet 149, and create a suction force sufficient to create a vacuum within the seal pack 100 and to draw the wash fluid from the needle wash reservoir and into the wash inlet 141, as schematically depicted in FIG. 1. The wash outlet 149 may be disposed within the middle body portion 120, configured to allow a wash solution or wash fluid to exit the interior of the seal pack 100. In alternative embodiments, the wash outlet 149 may be disposed in the lower body portion 130 or the upper body portion 110. The wash outlet 149 may also include a wash outlet flow path 148 that may extend within the seal pack 100 to fluidically and physically connect the wash outlet 149 to an intermediate wash flow path 147. The intermediate wash flow path 147 may connect the wash flow path 146 to the wash outlet flow path 147 and ultimately the wash outlet 149. The intermediate flow path 147 may extend across multiple body portions of the seal pack 100, such as the lower body portion 130 and the middle body portion 120. At these points where the intermediate flow path 147 extends across the body portions of the seal pack 100, a washer or seal may be disposed.

Accordingly, embodiments of the seal pack 100 may include a wash fluid flow path configuration that promotes direct contact between the wash fluid 5 and the sample needle 160, such that the wash fluid 5 flows axially along a length of the exterior surface of the sample needle 160 simultaneously or otherwise at one or more locations (e.g. above and below high-pressure seal arrangement 125). FIG. 6 depicts a wash cycle through the seal pack 100 when the sample needle 160 is in a first position, in accordance with embodiments of the present invention. In the first position, a tip of the sample needle 160 is positioned above the bushing 135 of the lower body portion 130, within the central pathway 165 of the lower body portion 130. If a wash cycle is initiated while the sample needle 160 is in the first position shown in FIG. 6, the sample needle 160 may still be washed by the wash fluid 5, axially along the exterior surface of the sample needle 160. A wash fluid 5 may be drawn in to the wash inlet 141 by suction forces created when the needle wash pump is activated and the valve V4 associated with the needle wash reservoir is in a position to allow flow of the wash fluid 5 from the wash reservoir. The wash fluid 5 may flow through the wash inlet 141 and through the wash inlet flow path 142 to the central pathway 165 where the wash inlet flow path 142 intersections or connects with the central pathway 165. The wash fluid 5 may thus flow axially along and against a length of the exterior surface of the sample needle 160 through the central pathway 165 in a vertical direction (e.g. up) along axis 3 to the wash flow path 143. The flow of the wash fluid 5 axially across the sample needle 160 may act to clean and/or wash the sample needle 160 to help remove unwanted sample from previous runs that may have contacted the sample needle 160. The wash fluid 5 may continue flowing through the wash flow path 143 and through the connecting wash path 144 to reach the wash flow path 145. Because there is no lower wash frit, the wash fluid 5 continues through wash flow path 145 and may flow axially along and against a length of the exterior surface of the sample needle 160 through the central pathway 165 in a vertical direction (e.g. down) along axis 3 to the wash flow path 146. The flow of the wash fluid 5 axially across the sample needle 160 may act to clean and/or wash the sample needle 160 to help remove unwanted sample from previous runs that may have contacted the sample needle 160. The wash fluid may then flow through the wash flow path 146 and exit via the wash outlet 149. In an exemplary embodiment, the wash fluid 5 may flow through the intermediate wash flow path 147 to the wash outlet flow path 148 and out through the outlet 149 to a wash waste reservoir. Thus, when the sample needle 160 is in the first position, prior to aspirating a sample from a sample source, the wash fluid 5 may be directly contacting the surface of the sample needle 160 to provide washing/cleaning benefits.

FIG. 7 depicts a wash cycle through the seal pack of FIG. 5, when the sample needle is in a second position, in accordance with embodiments of the present invention. The flow path of the wash fluid 5 may be the same or substantially the same as when the sample needle 160 is in the first position. However, the wash fluid 5 may be flowing through the seal pack 100 as the sample needle moves from the first position shown in FIG. 6 to the second position shown in FIG. 7. To achieve the second position, the sample needle 160 is lowered or otherwise moved in a direction D (e.g. vertically along axis 3) towards a sample source, and eventually into a sample source (e.g. sample vial) to aspirate the sample. Thus, in exemplary embodiments, the sample needle 160 is being directly contacted with the wash fluid 5 axially along a length of the exterior surface of the sample needle 160 to remove sample from the exterior surface of the sample needle 160 and ultimately reduce a carryover percentage. Because the sample needle 160 is moving in direction D from the first position to the second position, and the wash fluid 5 flows axially along the sample needle 160 through sections of the central pathway 165, a surface area of the exterior surface of the sample needle 160 being cleaned is increased and overall exposure of the sample needle 160 to the wash fluid 5 is increased throughout the wash cycle.

Figure 8:
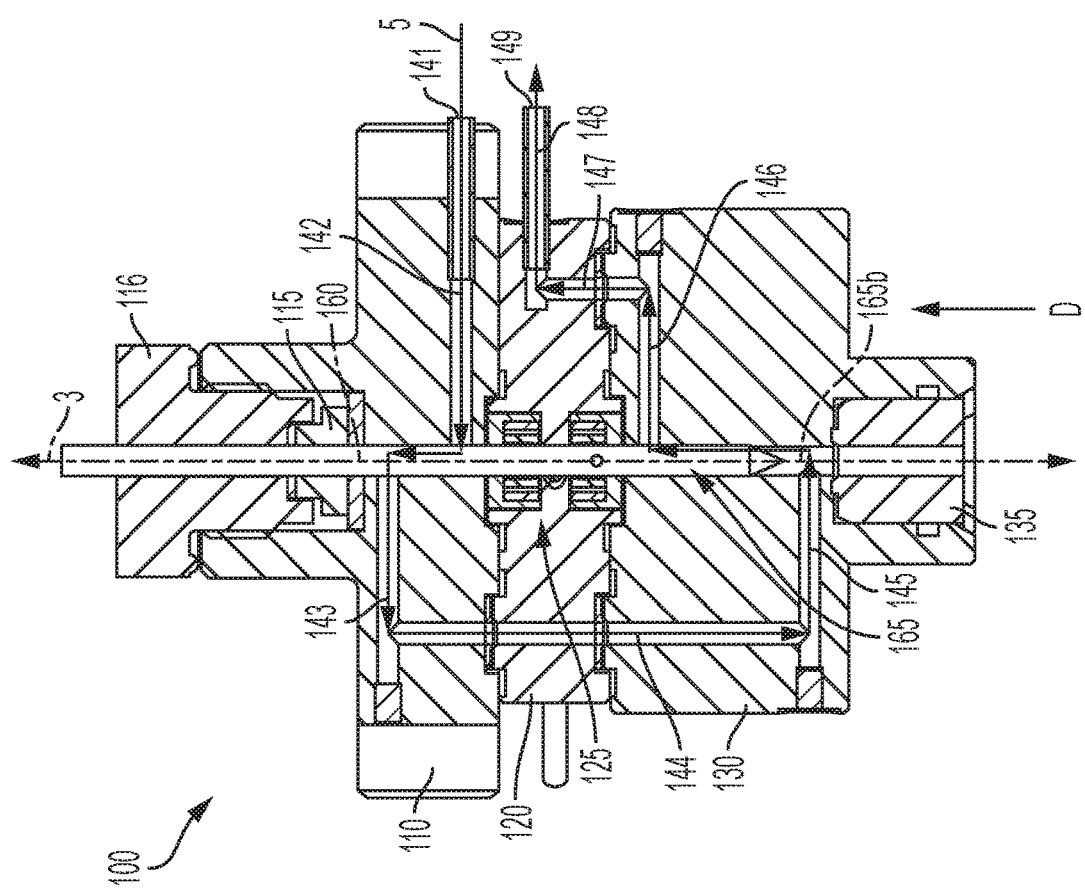
FIG. 8 depicts a wash cycle through the seal pack of FIG. 5, when the sample needle has returned to the first position, in accordance with embodiments of the present invention.

FIG. 8 depicts a wash cycle through the seal pack of FIG. 5, when the sample needle has returned to the first position, in accordance with embodiments of the present invention. The flow path of the wash fluid 5 may be the same or substantially the same as when the sample needle 160 is in the first position and second position. However, the wash fluid 5 may be flowing through the seal pack 100 as the sample needle 160 moves from the second position shown in FIG. 7 back to the second position shown in FIG. 8. To return to the first position from the second position, the sample needle 160 is raised or otherwise moved in a direction D (e.g. vertically along axis 3) away from a sample source to eventually inject the sample into the high-pressure analytic flow path flowing through the seal pack 100 and ultimately to the column of the liquid chromatography system. Thus, in exemplary embodiments, the sample needle 160 is being directly contacted with the wash fluid 5 axially along a length of the exterior surface of the sample needle 160 to remove sample from the exterior surface of the sample needle 160 and ultimately reduce a carryover percentage. Because the sample needle 160 is moving in direction D from the second position to the first position, and the wash fluid 5 flows axially along the sample needle 160 through sections of the central pathway 165, a surface area of the exterior surface of the sample needle 160 being cleaned is increased and overall exposure of the sample needle 160 to the wash fluid 5 is increased throughout the wash cycle.

In alternative embodiments, the seal pack 100 may include one or more flow paths in addition to the flow paths shown in FIGS. 5-8. For example, embodiments of the seal pack 100 may have a wash flow path configuration that directs the wash fluid 5 to flow through the central pathway 165 at more than two distinct and discrete locations. Further, embodiments of the seal pack 100 may include a wash flow path configuration that only washes the sample needle 160 above the high-pressure seal arrangement 125 or only below the high-pressure seal arrangement 125.

Referring now to FIGS. 1 and 5-8, embodiments of the seal pack 100 may be a part of an autosampler or sample manager of a liquid chromatography system 10. In an exemplary embodiment, an autosampler of a liquid chromatography system may include a sample needle 160 configured to aspirate a sample from at least one sample source and inject the sample into an analytic flow path of the liquid chromatography system, and a seal pack 100 comprising a plurality of wash flow pathways fluidically connected to a central pathway that accommodates the sample needle, wherein a first wash flow pathway is vertically offset from a second wash flow pathway. Embodiments of the autosampler may also include a pump delivering a mobile phase to the seal pack 100, and a needle wash pump fluidically connected to the seal pack 100 to draw a wash solution 5 through the plurality of wash flow pathways of the seal pack 100 and into a waste reservoir. In the autosampler of exemplary embodiments of the present invention, when the needle wash pump draws the wash solution through the plurality of wash flow pathways, a wash solution flows axially along an exterior surface of the sample needle in a vertical direction to wash the sample needle when flowing from the first wash flow pathway to the vertically offset second wash flow pathway.

Furthermore, a method of washing a sample needle 160 of a liquid chromatography system may include a step of directing a wash fluid 5 axially along an exterior surface of a sample needle 160 contained within a central pathway 165 of a seal pack 100, the central pathway 165 guiding the sample needle 160 in a vertical only direction. Embodiments of the step of directing the wash solution 5 axially along the exterior surface of the needle 160 may include multiple steps. For instance, the step of directing the wash solution 5 axially along the sample needle 160 may include a step of connecting a wash fluid inlet flow path 142 located in an upper body portion 110 of the seal pack 100 to the central pathway 165. The directing may also include a step of vertically offsetting a wash flow path 143 located within the upper body portion 110 from the wash fluid inlet flow path 142 along the central pathway 165, and/or vertically offsetting a wash flow path 146 located within the lower body portion 130 from a wash flow path 145 also located in the lower body portion, along the central pathway 165. The directing step may also include fluidically connecting a wash flow outlet disposed within the seal pack 100 to draw the wash solution 5 into the wash fluid inlet flow path 142/141 and through the central pathway against the exterior surface of the sample needle 160 to the wash flow paths of the seal pack 100. The step of directing may also include the steps of interconnecting the wash flow path 143 located in the upper body portion 110 of the seal pack 100 with a first wash flow path 145 located in a lower body portion 130 of the seal pack 100, connecting the first wash flow path 145 to the central pathway 165, and vertically offsetting a second wash flow path 146 located in the lower body portion 130 of the seal pack 100 from the first wash flow path 145 along the central pathway 165. Moreover, embodiments of the method of washing the sample needle 100 may also include a step of disposing a bushing 135 having a bore for receiving the sample needle 160 in the lower body portion 120 of the seal pack 100, the bushing 135 preventing the sample needle 160 from contacting a surface of the lower body portion 130 of the seal pack 100 as the sample needle 160 moves vertically in and out of the seal pack 100 to aspirate a sample. The method may also include a step of drawing air through an opening in the bushing 135 disposed in the lower body portion 130 of the seal pack 100 as the wash fluid 5 is drawn through the seal pack 100 to reduce an overall solvent consumption rate as a needle wash pump is turned on. The method may achieve a carryover percentage equal to or less than 0.0025%.

Furthermore, seal pack 100 may be conducive to applying new wash sequences that can reduce a carryover percentage. An exemplary wash sequence for washing a sample needle of an autosampler of a liquid chromatography system may include continuously washing an exterior surface of the sample needle 160 contained within a seal pack 100 of the autosampler as the sample needle 160 moves toward a sample source located proximate the seal pack 100, for a predetermined amount of time. During the wash sequence, the exterior surface of the sample needle 160 may be washed as the sample needle 160 moves up and away from the sample source. The wash sequence may include more than one modes or sequences. For example, the wash sequence may include a "normal" sequence, a "double" sequence, and an "extended" sequence.

In the normal sequence, the predetermined amount of time of washing the sample needle 160 may be between 3-4 seconds (e.g. 3.6 second), as the sample needle 160 moves from inside the seal pack towards the sample source and into the sample source to aspirate the sample. In the "double" sequence, the predetermined amount of time of washing the sample needle 160 may be between 14-16 seconds (e.g. 15 second), as the sample moves towards the sample source and into the sample source to aspirate the sample. The time for the washing cycle in the "double" sequence is approximately double or slightly more than double the time in the "normal" sequence.

In the "double" sequence, a movement speed of the sample needle 160 from inside the seal pack 100 to the sample source may be reduced, slowed, throttled, etc. to extend the predetermined amount of wash time from 3-6 seconds to 14-16, without pausing the movement of the needle 160, as compared to a movement speed of the sample needle in the "normal" sequence. In previous, known wash sequences, a movement of the needle 160 would be paused for a predetermined amount of time (e.g. 14 seconds) while the sample needle 160 was in the position shown in FIG. 3, wherein the wash fluid was only contacting and moving around the wash frit 35. Thus, by not pausing and continuously but controllably reducing a movement speed of the sample needle 160 as the sample needle 160 enters the sample source, a duration of direct exposure of the exterior surface of the sample needle 160 to a wash fluid 5 is thereby increased, which can reduce a carryover percentage.

In the "extended" sequence, the predetermined amount of wash time as the sample needle 160 moves towards the sample source to aspirate the sample may be equivalent to the "double" sequence, but may also include an additional washing step for a predetermined amount of time as the sample needle 160 moves away from the sample source and returns to an original position within the seal pack 100. The predetermined amount of time of the additional washing step (e.g. 14-16 seconds) may be equivalent to the predetermined amount of time for the "double" sequence. In previous, known wash sequences, a movement of the needle 160 would be paused for a predetermined amount of time (e.g. 40 seconds) while the sample needle 160 was in the position shown in FIG. 3, wherein the wash fluid was only contacting and moving around the wash fit 35. Thus, by not pausing and continuously but controllably reducing a movement speed of the sample needle 160 as the sample needle 160 enters the sample source and returns to the interior of the seal pack 100, a duration of direct exposure of the exterior surface of the sample needle 160 to a wash fluid 5 is thereby further increased, which can reduce a carryover percentage.

During the wash sequence described herein, the continuous washing of the exterior surface of the sample needle 160 may occur axially along the sample needle 160 in a vertical direction, within a central pathway 165 of the seal pack 100. For instance, a wash fluid 5 may directly contact the exterior surface of the sample needle 160 during the continuous washing. Furthermore, the sample needle 160 may only move up and down within the seal pack 100 during the continuous washing of the wash sequence, and the sample needle 160 may not be relocated to a separate component for washing, remaining within the central pathway 165 of the seal pack 100. Using this wash sequence with the seal pack 100 may achieve a carryover percentage is equal to or less than 0.0025%.

Figure 9:
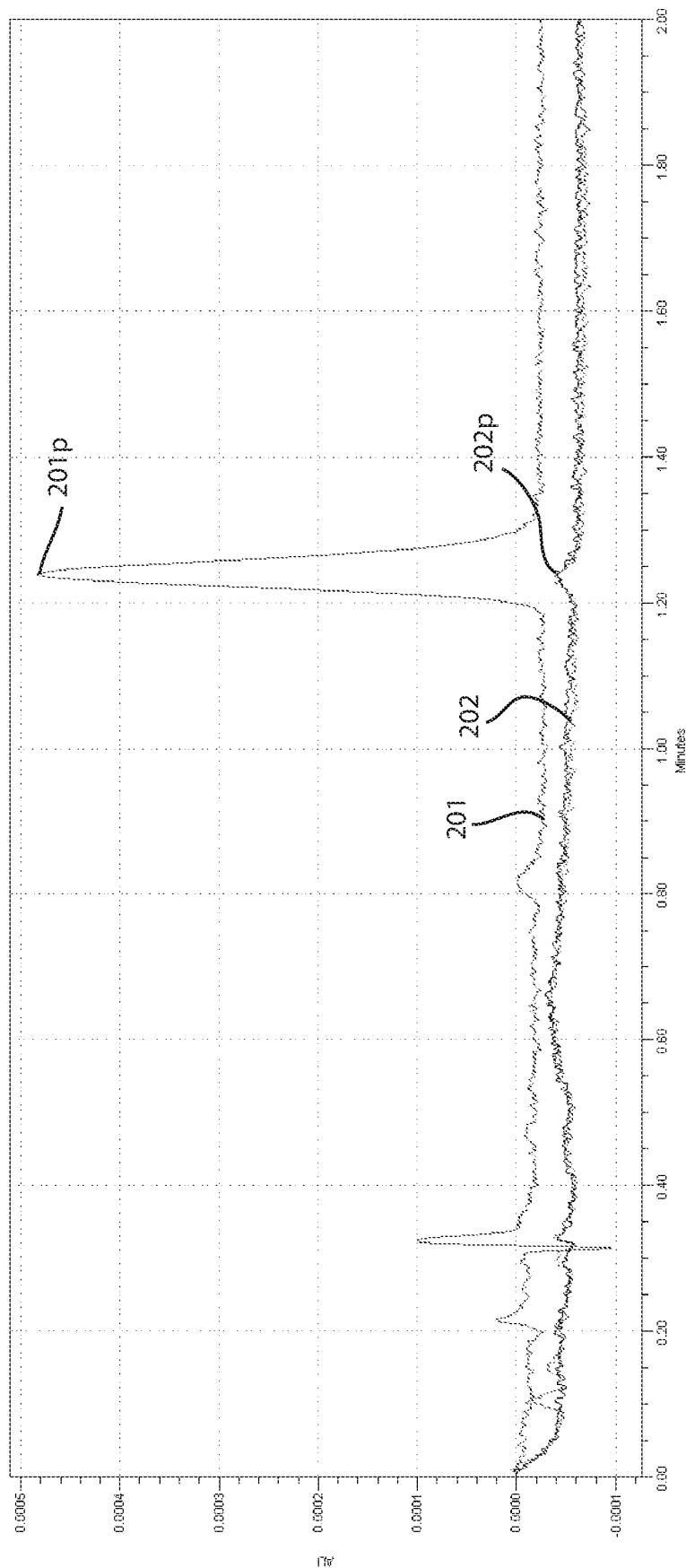
FIG. 9 depicts a graphical illustration of achieving a carryover percentage below 0.0025% using the seal pack of FIG. 5, in accordance with the embodiments of the present invention.

FIG. 9 depicts a graphical illustration of achieving a carryover percentage below 0.0025% using the seal pack of FIG. 5 and the "normal" wash sequence, in accordance with the embodiments of the present invention. The carryover percentage well below 0.0025% may be achieved using the seal pack 100 with the other wash sequences described above. Carryover percentage may refer to the presence of an analyte after a blank having no sample is injected into the analytic flow path. Systems Qualification Tests (SQT) may be performed to test a carryover percentage. To test for a carryover percentage, a blank having no sample and only mobile phase (e.g. solvent) is first injected into the analytic flow path to show that the sample needle 160 is clean. Then, a carryover standard 201 of sample is injected into the analytic flow path. In FIG. 9, the carryover standard injection was 0.0025%. Next, a challenge sample containing a sample is injected into the analytic flow path. After the challenge sample is injected, one or more blanks 202 (e.g. no sample, only mobile phase) may again be injected into the analytic flow path. FIG. 9 indicates the peak carryover percentage for the carryover standard injection at 201p, and indicates the peak carryover percentage for two blanks after the challenge sample was injected at 202p. As can be seen graphically in FIG. 9, the peak carryover percentage after the challenge sample was injected was well below 0.0025% (i.e. 0%). The sample used in the SQT shown in FIG. 9 is caffeine. However, the seal pack 100 using the "normal" wash sequence achieves a carryover percentage below 0.0025% and at 0 (i.e. carryover) for other samples, such as anthracene, diphenhydramine, oxybutynin, and sulfadimethoxine. Accordingly, the seal pack 100 may reduce or eliminate a carryover percentage as compared to previous, known seal packs.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A seal pack of a sample manager of a liquid chromatography system, the seal pack having an upper body portion, a middle body portion, and a lower body portion, which forms a general body structure of the seal pack, the seal pack comprising:

a central flow path extending vertically through the seal pack, the central flow path accommodating a sample needle;
 a wash inlet disposed in the upper body portion, configured to receive a wash solution, the wash inlet connecting to the central flow path by a wash inlet flow path;
 a first wash path disposed in the upper body portion and connected to the central flow path, the first wash path being vertically offset from the wash inlet;
 a connecting wash path extending through the upper body portion, the middle body portion, and the lower body portion, the connecting wash path connecting the first wash path to a second wash path disposed in the lower body portion, wherein the second wash path is connected to the central flow path;
 a third wash path disposed in the lower body portion, the third wash path being vertically offset from the second wash path; and
 a wash outlet disposed in the middle body portion connected to the third wash path by an intermediate flow path, the wash outlet includes a wash outlet flow path and is fluidically connected to a suction pump for drawing the wash solution through the seal pack.

2. The seal pack of claim 1, wherein, when the wash solution flows from the wash inlet to the first wash path, the wash solution flows axially along the sample needle in a vertical direction to directly wash the sample needle, further wherein, when the wash solution flows from the second wash path to the third wash path, the wash solution flows axially along the sample needle in a vertical direction to directly wash the sample needle.

3. The seal pack of claim 1, wherein the seal pack does not include a lower wash frit.

4. The seal pack of claim 1, further comprising an upper wash frit retainer and an upper wash frit, wherein the sample needle passes through the upper wash frit.

5. The seal pack of claim 1, further comprising a bushing disposed within the lower body portion, the bushing having a central bore for receiving the sample needle as the sample needle moves toward a sample source, wherein the bushing is comprised of a non-metal material and prevents damage to the sample needle from contacting a metal surface of the seal pack as the sample needle moves towards and away from the sample source.

6. The seal pack of claim 1, wherein the wash solution is flowing through the seal pack as the sample needle is moving within the seal pack.

7. The seal pack of claim 1, further comprising a first high-pressure seal and a second high-pressure seal, the first high-pressure seal and the second high-pressure seal are disposed within the middle body portion, and form a seal around the sample needle at a point where a sample is injected into an analytic flow path.

8. The seal pack of claim 1, wherein a carryover percentage is equal to or less than 0.0025%.

* * * * *